United States Patent [19]

Ishimori et al.

[11] Patent Number: 5,123,805
[45] Date of Patent: Jun. 23, 1992

[54] FRAME STRUCTURE FOR ATTACHING A WORKING IMPLEMENT

[75] Inventors: Shoso Ishimori, Madrid, Spain; Taichi Fujiwara, Sakai, Japan

[73] Assignee: Kubota Corporation, Osaka, Japan

[21] Appl. No.: 675,197

[22] Filed: Mar. 26, 1991

[30] Foreign Application Priority Data

Jun. 2, 1990 [JP] Japan .................... 2-144673
Jun. 2, 1990 [JP] Japan .................... 2-144674

[51] Int. Cl.$^5$ .............................................. E02F 3/34
[52] U.S. Cl. .................. 414/686; 56/DIG. 22; 180/908; 280/781
[58] Field of Search ............ 414/686; 280/781; 180/900, 908; 56/DIG. 22, DIG. 14, 15.6, 15.7, 15.8; 172/272-275

[56] References Cited

U.S. PATENT DOCUMENTS

| | | | |
|---|---|---|---|
| 3,982,643 | 9/1976 | MacGregor et al. | 56/15.6 |
| 4,087,009 | 5/1978 | Profenna et al. | |
| 4,720,233 | 1/1988 | Meyer et al. | 414/686 |
| 4,737,067 | 4/1988 | Samejima et al. | 56/DIG. 22 X |
| 4,755,101 | 7/1988 | Hamada et al. | 414/686 |
| 4,882,898 | 11/1989 | Samejima et al. | 56/DIG. 22 X |
| 4,906,160 | 3/1990 | Kaufmann et al. | |

FOREIGN PATENT DOCUMENTS

| | | |
|---|---|---|
| 0000281 | 1/1979 | European Pat. Off. |
| 63-333672 | 12/1988 | Japan . |
| 660055 | 10/1951 | United Kingdom . |
| 801141 | 9/1958 | United Kingdom . |
| 932839 | 7/1963 | United Kingdom . |
| 2178290 | 2/1987 | United Kingdom . |
| 2218891 | 11/1989 | United Kingdom . |

Primary Examiner—Robert J. Spar
Assistant Examiner—Donald W. Underwood
Attorney, Agent, or Firm—Edwin E. Greigg; Ronald E. Greigg

[57] ABSTRACT

A frame structure for connecting working implements to a vehicle body having right and left main frames extending parallel to each other longitudinally of the vehicle body. The main frames are divided into upper front frames and lower rear frames which are interconnected through an intermediate connecting section. The front and rear frames have different heights to lower the center of gravity of the rear section of the vehicle body for promoting stability of vehicle control without impairing the steering function of front wheels. A cross support member is connected to bottom surfaces of the main frames in the region of the intermediate connecting section. This support member has opposite ends thereof extending laterally outwardly of the main frames. Outward extension of the cross support member include connecting elements for working implements. These connecting elements and the front frames are used as supporting connections for connecting working implements such as a front loader and a mower unit.

12 Claims, 9 Drawing Sheets

FRAME STRUCTURE FOR ATTACHING A WORKING IMPLEMENT

BACKGROUND OF THE INVENTION

1. Field of the Invention

The present invention relates to a frame structure for attaching a working implement to a vehicle having a main frame assembly including a plurality of frames spaced apart from one another transversely of the vehicle and extending longitudinally thereof.

2. Description of the Related Art

A frame structure of this type is disclosed in U.S. Pat. No. 4,087,009, for example. This known structure includes a pair of right and left vehicle frames extending longitudinally of the vehicle, and mounting bars extending parallel to the vehicle frames and connected thereto. The mounting bars carry brackets to which a backhoe implement is connected. A front loader implement is also attachable to the vehicle frames through vertical frames and support arms. In this connecting structure, a mounting range of the working implement transversely of the vehicle relies on the width of the vehicle frames. It is therefore necessary to ensure that the front loader implement, for example, does not interfere with front wheels, which allows only a limited freedom for the structure.

To avoid an interference between the front loader implement and front wheels, or to allow a front loader having an increased width to be attached to the vehicle, the mounting range must be transversely enlarged forwardly of the vehicle.

A structure taking this aspect into account is disclosed in Japanese Patent application No. 1988-333672 filed Dec. 28, 1988 (laid open under No. 1990-177803) owned by Applicant. According to this structure, long sub-frames are fixed to right and left sides of a vehicle frame assembly. Support frames and a reinforcing frame in a triangular shape in plan view extend laterally outwardly from longitudinally intermediate positions of the sub-frames. The support frames carry brackets fixed to outer ends thereof for connection to support frames of a working implement.

This structure receives and supports the load of the working implement rigidly with a long span longitudinally of the vehicle. However, its structure for connecting and supporting the working implement has the drawback of being complicated and having a large number of components.

SUMMARY OF THE INVENTION

An object of the present invention is to provide a simplified frame structure for attaching a working implement, which makes effective use of a vehicle's main frame assembly.

Another object of the present invention is to provide a simplified frame structure allowing a plurality of working implements to be attached.

The above objects are fulfilled, according to the present invention, by a frame structure for connecting a working implement to a vehicle body having main frame means spaced apart from each other transversely of the vehicle body and extending longitudinally thereof, the frame structure comprising an intermediate connecting section for connecting a pair of right and left front frames and a pair of right and left rear frames constituting the main frame means, the rear frames being disposed at a lower level than the front frames; a cross support member connected to bottom surfaces of the main frame means in a region of the intermediate connecting section, the cross support member having opposite ends thereof extending outwardly of the main frame means; and working implement connecting means fixed to outward extensions of the cross support member for connecting the working implement.

This frame structure includes a body frame assembly flexed in a stepped way with front and rear frames having different heights to lower the center of gravity of the rear section of the vehicle body for promoting stability of vehicle control without impairing the steering function of the front wheels. The cross support member interconnects bottom surfaces of the main frames in the region of the intermediate connecting section having a great mechanical strength. This support member has connecting elements fixed thereto for connecting a working implement. Thus, the load of the working implement is effectively supported.

As a result, the working implement is connected to and supported by the simple structure by making effective use of the vehicle frame structure without necessitating a manufacturing step of perforating the vehicle frames to maintain strength.

The vehicle frames per se are now used also as supporting members long in the fore and aft direction. This produces the advantage of stably supporting the load of the working implement with a long fore and aft span.

Moreover, a plurality of working implements may be attached simply and with sufficient stability by providing the working implement connecting means with connectors for a plurality of implements.

Other objects and features of this invention will be understood from the following description made with reference to the accompanying drawings.

BRIEF DESCRIPTION OF THE DRAWINGS

The drawings show frame structures for attaching working implements to a tractor according to the present invention, in which.

DETAILED DESCRIPTION OF THE PREFERRED EMBODIMENTS

Embodiments of the present invention will be described hereinafter with reference to the drawings.

Figure 1:
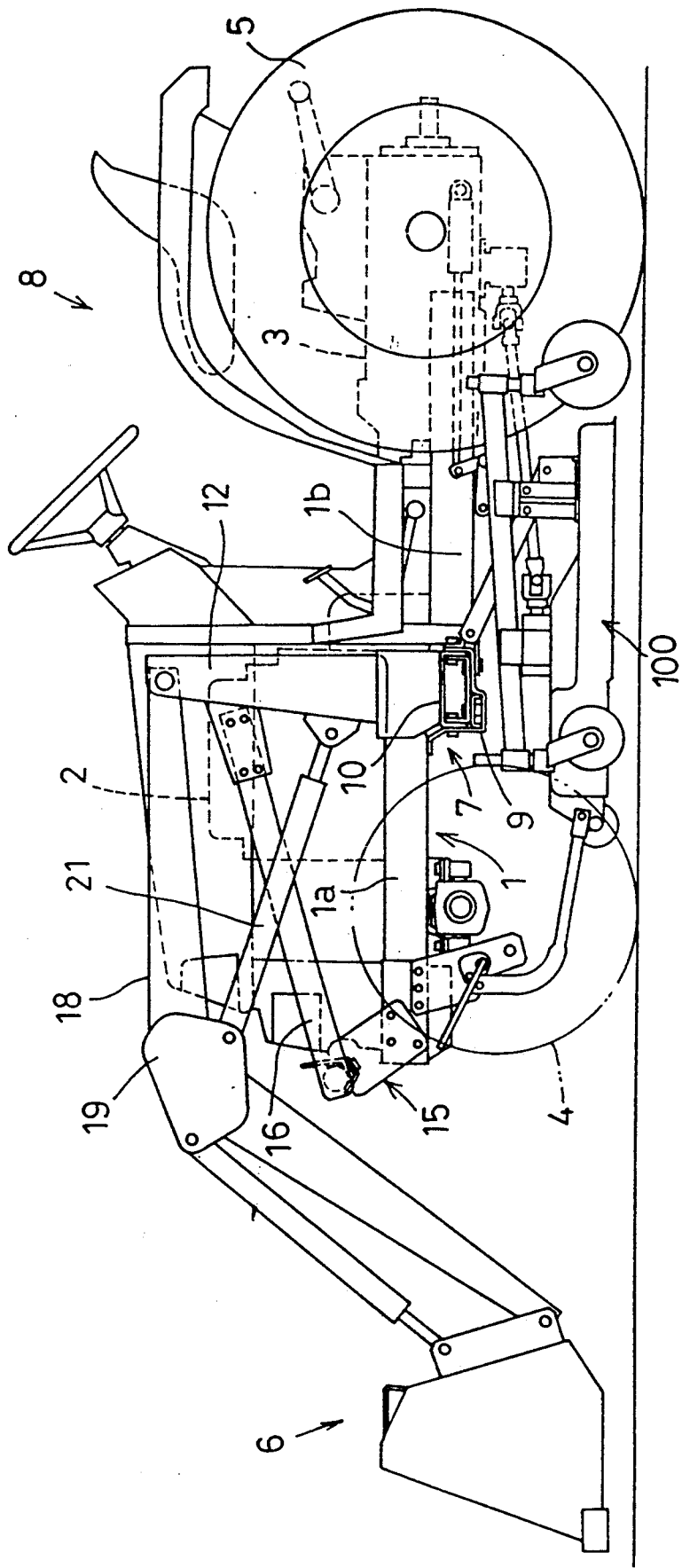
FIG. 1 is a side elevation of a tractor carrying a front loader and a mower unit.

FIG. 1 shows a tractor according to the present invention. This tractor comprises a pair of right and left body frames 1 extending longitudinally of a tractor body, i.e. substantially over an entire fore and aft length of the tractor body. The body frames 1 carry an engine 2 mounted on a forward position thereof, and a transmission case 3 on a rearward position. Power of the engine 2 is supplied through the transmission case 3 to front and rear wheels 4 and 5 to drive the tractor. The tractor carries a front loader implement 6 forwardly thereof, which is one example of front mount working implements. The tractor further carries a mower unit 100 suspended under the tractor body between the front wheels 4 and rear wheels 5. The way in which this mower unit 100 is attached to the tractor body will be described in detail later in another embodiment.

Figure 5:
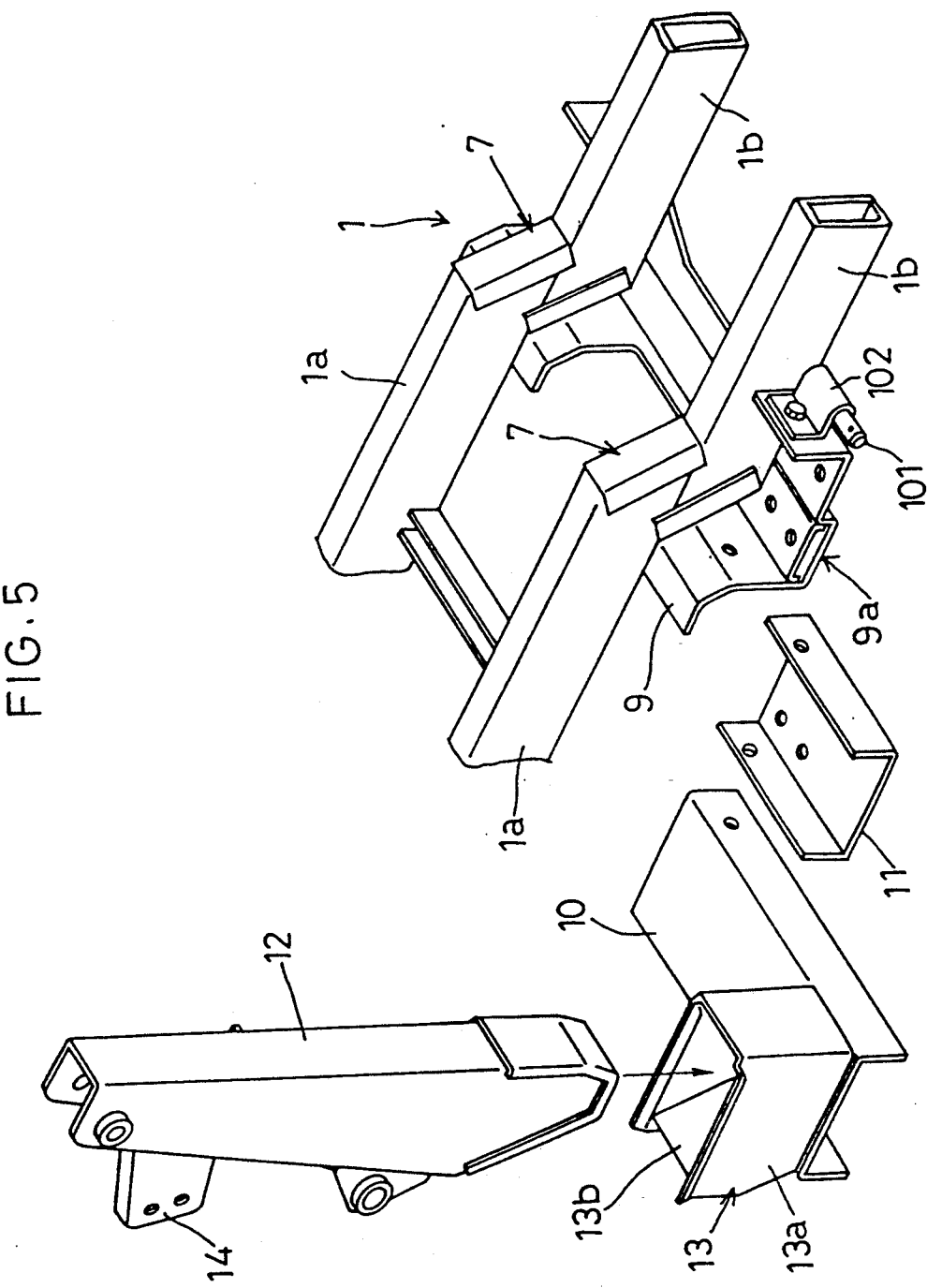
FIG. 5 is an exploded perspective view of the mounting frame.

As shown in FIG. 5, each body frame 1 includes a front frame 1a and a rear frame 1b, the rear frame 1b being on a level below the front frame 1a, which are interconnected in a stepped way by an intermediate connection 7. This construction maintains axles of the front wheels 4 having a steering mechanism at a predetermined height, and a driver's section 8 provided rearwardly on the tractor body in a lower height, to realize improved stability for controlling the tractor.

A connecting structure for the front loader implement 6 will be described next.

Figure 2:
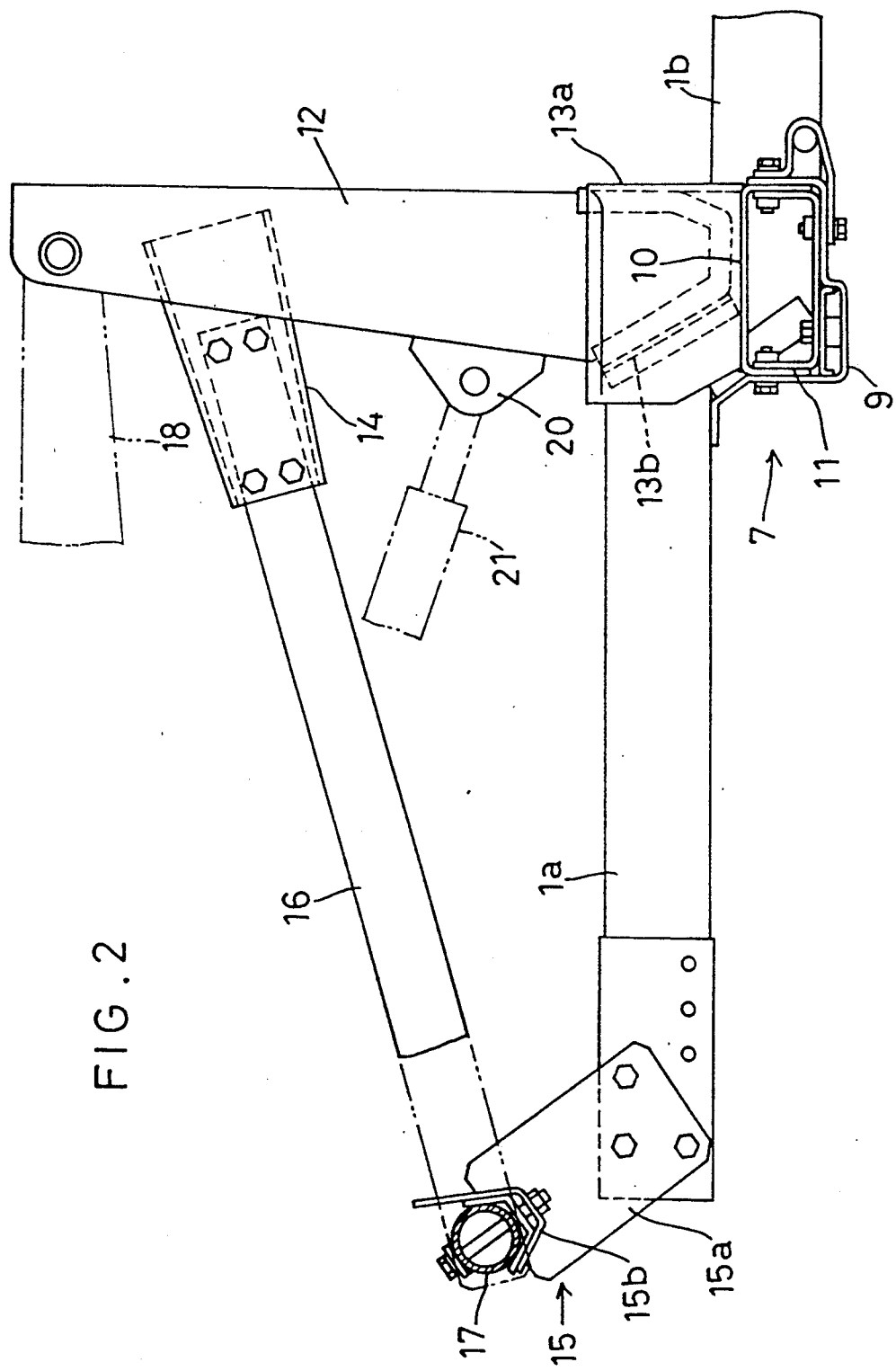
FIG. 2 is a side view of a mounting frame.
Figure 3:
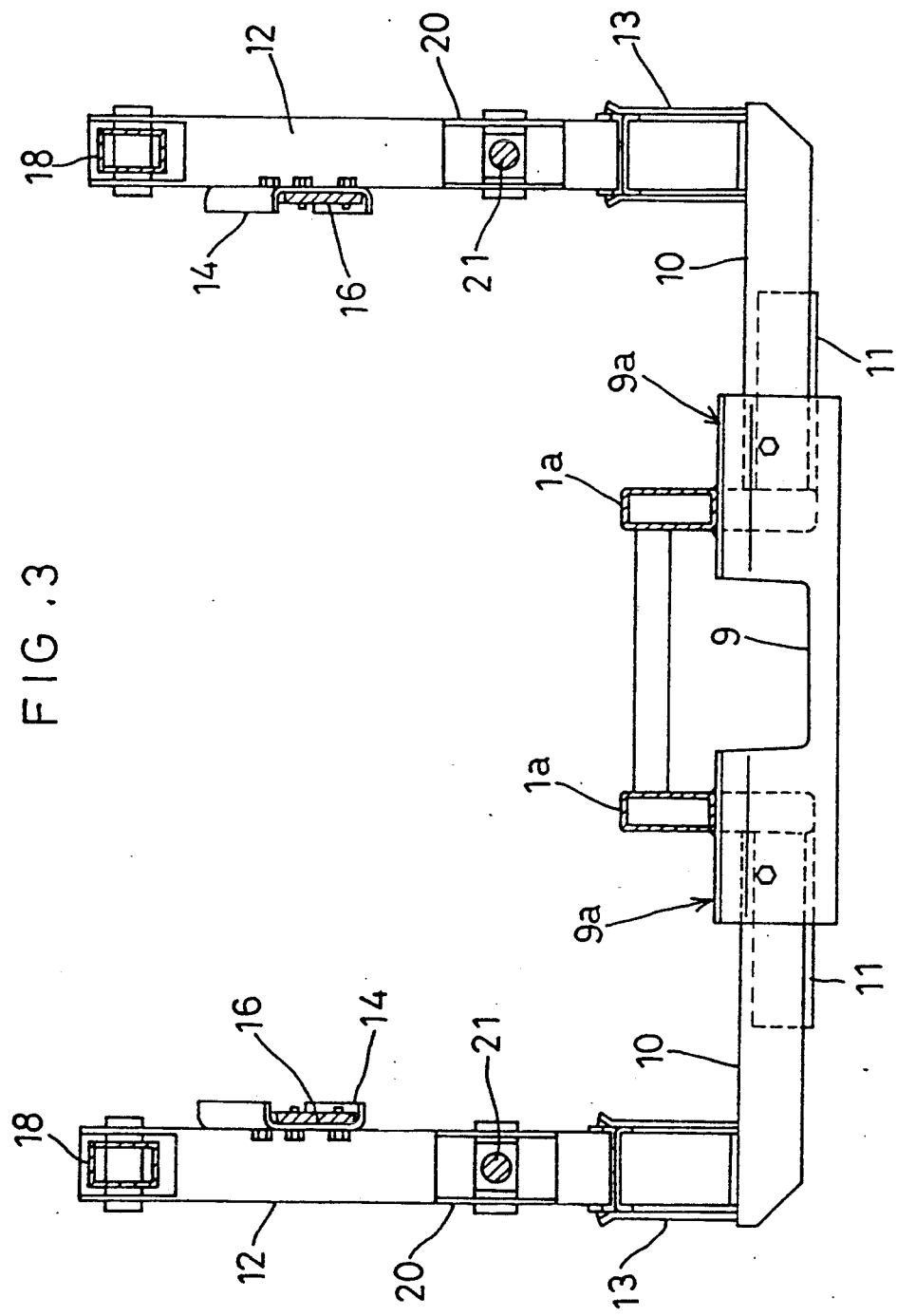
FIG. 3 is a front view in vertical section of the mounting frame.

As shown in FIGS. 2 and 3, a cross support member 9 formed by bending a sheet material is provided in the region of intermediate connections 7 between the front and rear frames 1a and 1b arranged side by side. This support member 9 transversely bridges bottom surfaces of these frames 1a and 1b, with opposite ends thereof extending outwardly. The support member 9 has front edges bent upward adjacent projections 9a which extend laterally outwardly of the front and rear frames 1a and 1b. These front edges are in contact with and welded to the bottom surfaces of the front frames 1a and intermediate connections 7. The support member 9 is welded also to the bottom surfaces of the rear frames 1b.

The projections 9a are bent upward at rear ends thereof, which carry pivot pins 101 for pivotally supporting rear links of a link mechanism for the mower unit 100, and mounting brackets 102 for retaining the pins 101 in position.

The right and left projections 9a of the support member 9 have, fixed thereto, connecting and supporting members 10 for the front loader implement 6. Specifically, a channel-shaped connecting and supporting member 10 is placed with its opening directed downwardly in an upwardly opening recess region of each projection 9a, and a channel-shaped reinforcing member 11 is placed with its opening directed upwardly inside the connecting and supporting member 10 and projection 9a fitted together. These components are rigidly interconnected to form a box-like support frame structure.

The connecting and supporting members 10 extend laterally outwardly of the tractor body, and carry sockets 13 fixed to outward ends thereof for receiving support columns 12 of the front loader implement 6. Each socket 13 includes a U-shaped frame 13a rigidly welded to the connecting and supporting member 10, and a wedge-shaped base 13b mounted in the U-shaped frame 13a. Each support column 12 has a tapered lower end to fit into the wedge-shaped base 13b.

Each support column 12 carries a connecting bracket 14 fixed to a vertically intermediate position thereof. A support arm 16 is connected between this bracket 14 and a support element 15 provided at a forward end of each front frame 1a. The right and left support arms 16 are interconnected at forward ends thereof by a connecting pipe 17 which is connected to the right and left support elements 15.

Figure 4:
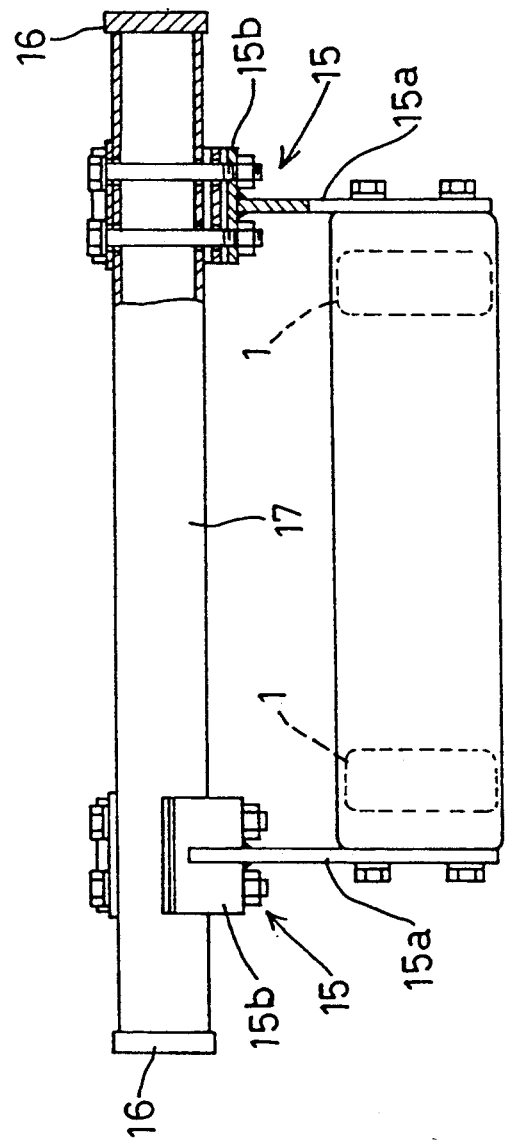
FIG. 4 is a front view of a forward support portion of the front loader.

As also shown in FIG. 4, each support element 15 includes a bracket 15a fixed to a lateral face at the forward end of the right or left front frame 1a, and a seat 15b welded to the bracket 15. The connecting pipe 17 is placed on and bolted to the seat 15b.

The front loader implement 6 has booms 18 each pivotally connected to an upper end of the right or left support column 12. Each boom 18 is vertically movable by a hydraulic cylinder 21, shown in two dot-and-dash lines in FIG. 2, extending between a bracket 19 attached to an intermediate position of the boom 18 and a bracket 20 attached to a lower intermediate position of the support column 12.

Next, a tractor having link mechanisms for attaching a mower unit 100 acting as a working implement and for attaching a further working implement will be described with reference to FIGS. 6 through 11.

Figure 6:
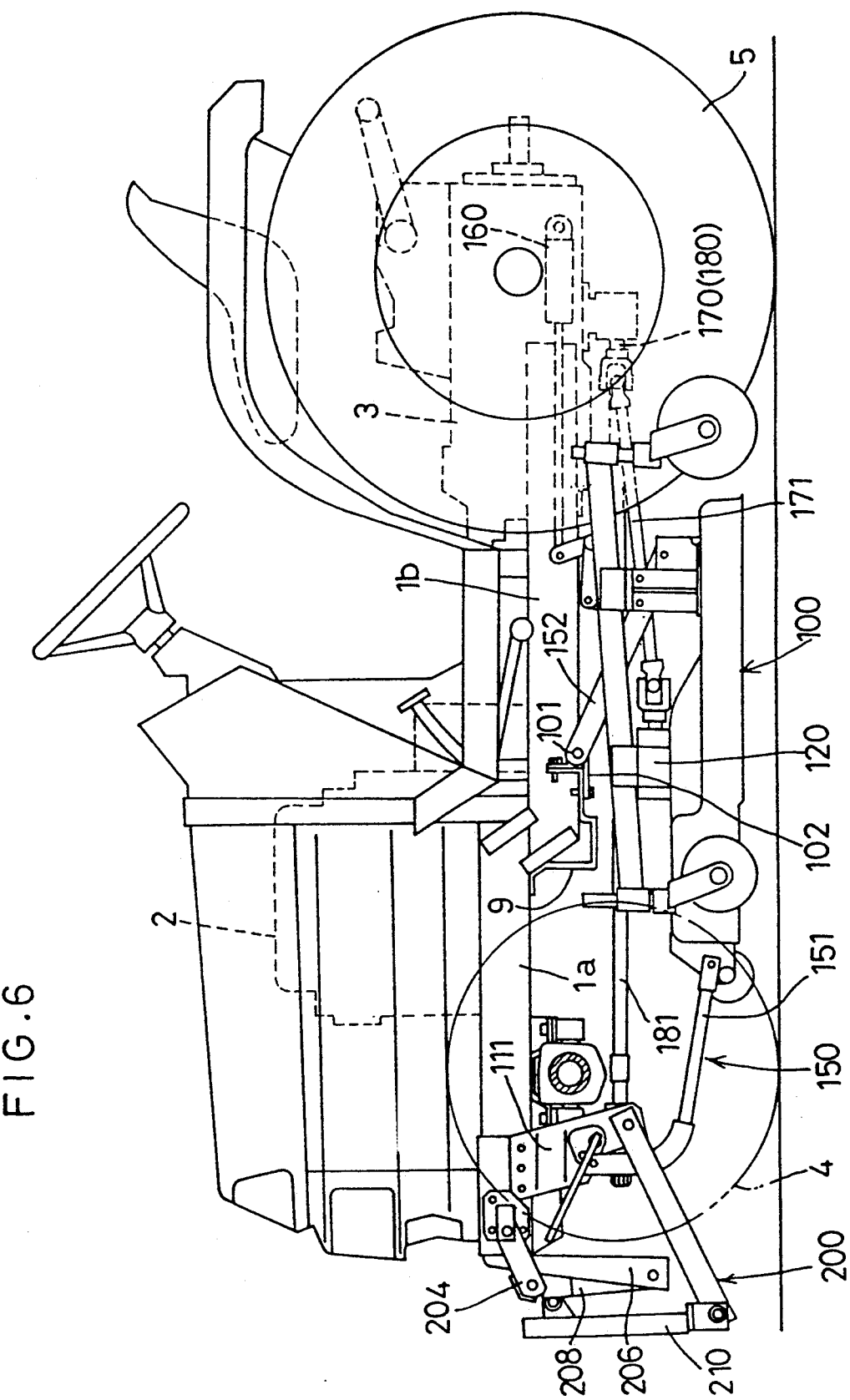
FIG. 6 is a side elevation of a tractor including link mechanisms for carrying a mower unit and a further working implement.

The tractor shown in FIG. 6 is substantially the same as the tractor shown in FIG. 1. This tractor comprises a pair of right and left, front and rear frames 1a and 1b extending substantially over an entire fore and aft length of a tractor body. The front frames 1a carry an engine 2, and the rear frames 1b a transmission case 3. Power of the engine 2 is supplied through the transmission case 3 to front and rear wheels 4 and 5 to drive the tractor. The tractor carries the mower unit 100 vertically movably connected through a parallel link mechanism 150 to a bottom of the tractor body between the front wheels 4 and rear wheels 5.

The tractor further includes a vertically movable link mechanism 200 through which a working implement such as a snow blower (not shown) may be detachably attached to the tractor. Of course, a front loader as shown in FIG. 1 may be connected to the front of the tractor at the same time or as a replacement.

The way in which the mower unit 100 is connected to the tractor body will be described next.

As shown in FIG. 6, the mower unit 100 is pivotally connected to the front frames 1a through a pair of right and left front traction links 151. The mower unit 100 is vertically movable by a lift cylinder 160.

Figure 7:
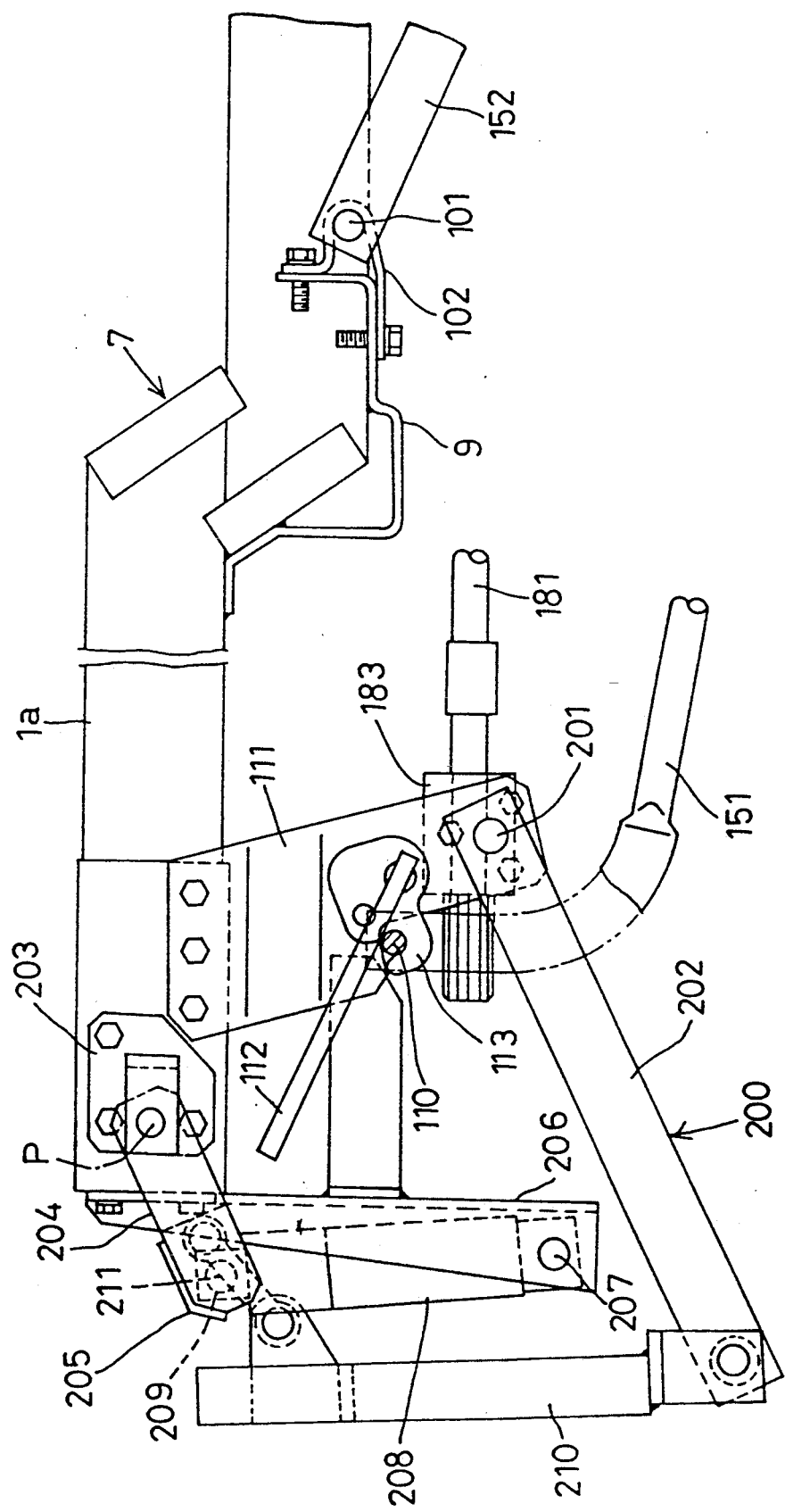
FIG. 7 is a side view of a connecting region of a mounting frame, the mower unit and a link mechanism.

More particularly, as shown in FIG. 7, the front links 151 are interconnected at forward ends thereof by a rod 110. The rod 110 is engaged with hooks 113 connected to brackets 111 fixed to and extending downwardly from lateral walls of the right and left front frames 1a, respectively. The hooks 113 are pivotable between and lockable to an engaging position and a releasing position by a rocking operation of a lever 112.

Figure 8:
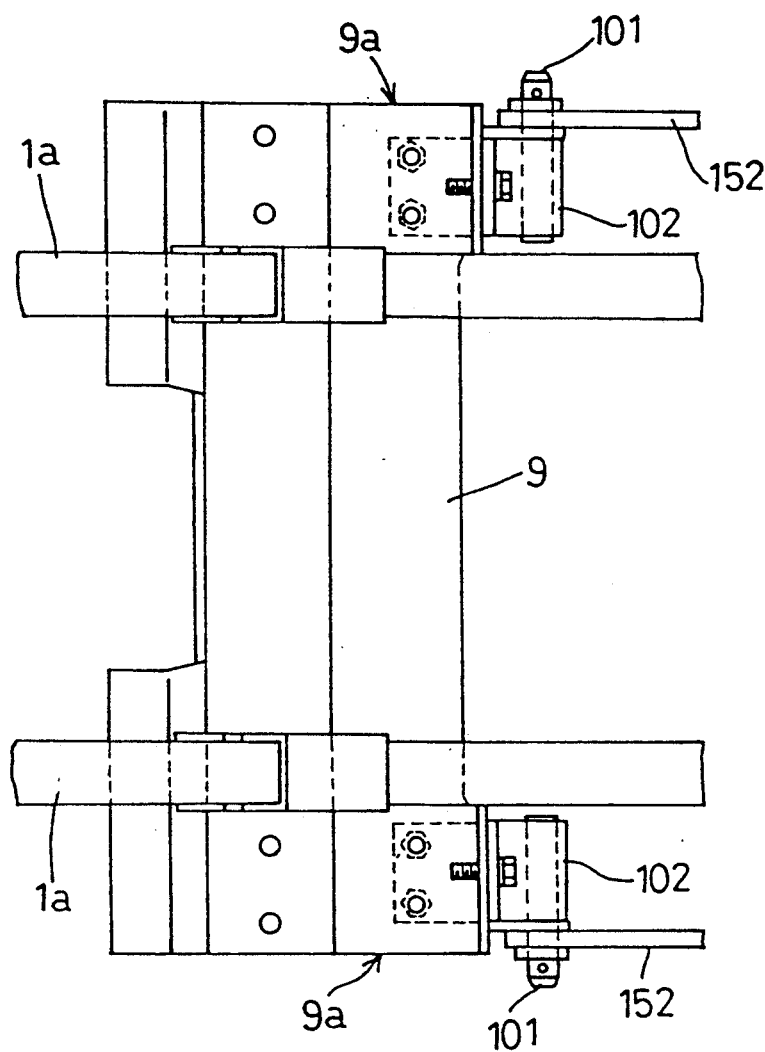
FIG. 8 is a plan view showing a connecting region of a parallel link mechanism of the mower unit.

As described in the preceding embodiment, and as shown in FIG. 8, the projections 9a of the cross support member 9 are bent upward at rear ends thereof, and pin brackets 102 to which pivot pins 101 are fixed are bolted to vertical walls defined by the upwardly bent rear ends and bottom walls of the projections 9a. Rear links 152 are connected to the pivot pins 101, respectively.

The connecting structure for the front mount working implement will be described next.

Figure 9:
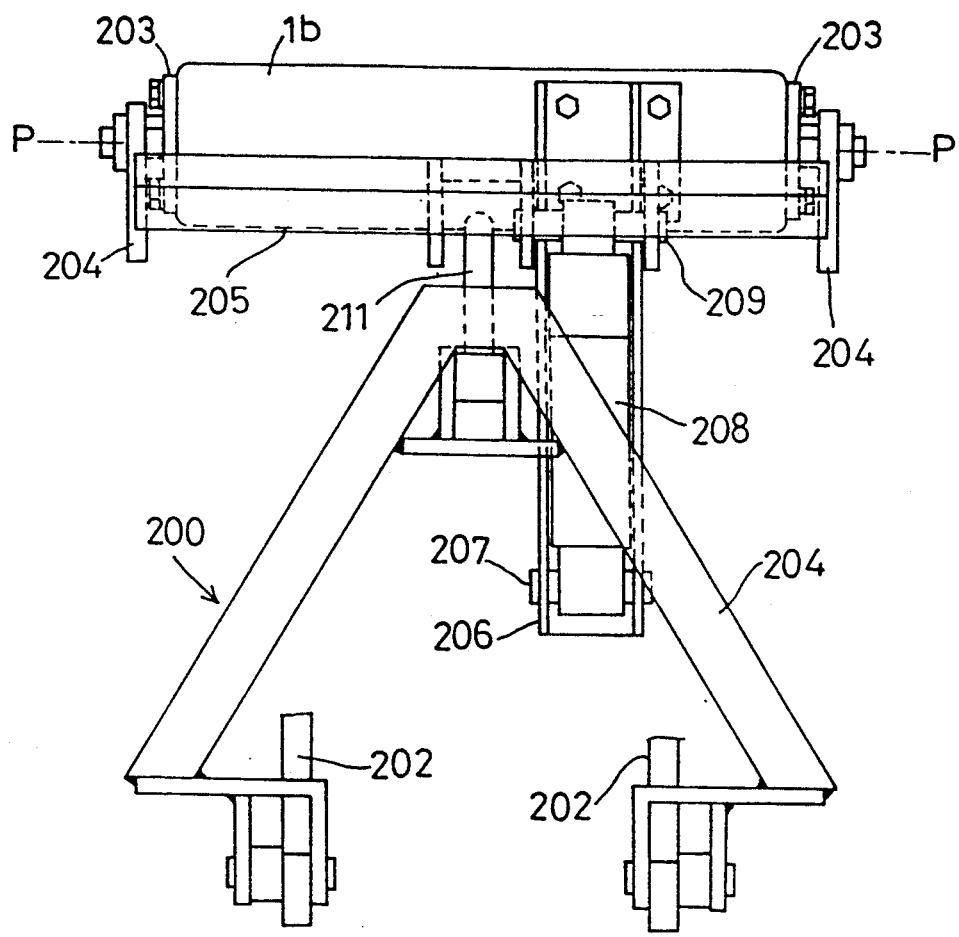
FIG. 9 is a front view of the link mechanism.
Figure 10:
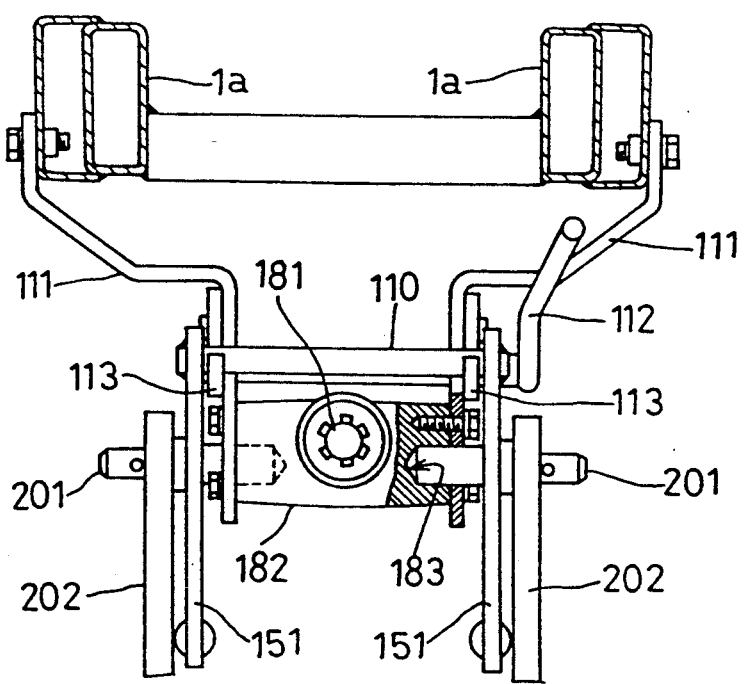
FIG. 10 is a fragmentary front view of a power relaying region of a power takeoff system.

The link mechanism 200 for connecting a front mount working implement is provided forwardly and downwardly of the front frames 1a. Specifically, as shown in FIGS. 7, 9 and 10, right and left lower links 202 are pivotally connected to pivot pins 201 extending laterally from the right and left brackets 111 to which the traction links 151 of the mower unit 100 are connected. On the other hand, swing arms 204 are connected, for pivotal movement about the same transverse axis P, to supporting brackets 203 fixed to side faces at the forward ends of the respective front frames 1a. The swing arms 204 are interconnected through a transverse connecting member 205 to be pivotable together. A channel-shaped supporting member 206 is bolted to a front end face of the front frames 1a. This supporting member 206 carries a cross axis 207 at a lower end thereof, to which a lower end of a hydraulic cylinder 208 is pivotally connected. The hydraulic cylinder 208 is pivotally connected at an upper end thereof through a pin 209 to an intermediate position of the connecting member 205. A connecting frame 210, approximately triangular in front view, for connecting a working implement is pivotally connected through a connector 211 to a transversely mid-position of the connecting member 205. The connecting frame 210 is pivotally connected at right and left lower ends thereof to forward ends of the lower links 202. In this way, the link mechanism 200 allows the working implement to be raised and lowered by extending and contracting the hydraulic cylinder 208.

Figure 11:
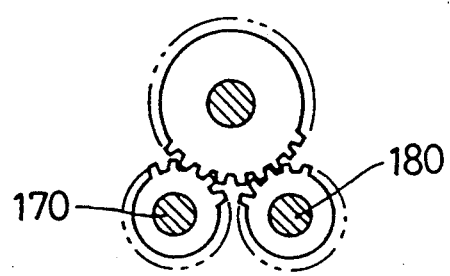
FIG. 11 is a vertical section of power takeoff shafts.

Power for driving the mower unit 100 and the front mount working implement is transmitted through power takeoff shafts 170 and 180 arranged side by side, as shown in FIG. 11, and extending forwardly under a transmission case 3 disposed rearwardly of the tractor body. The lefthand power takeoff shaft 170 supplies power through a transmission shaft 171 to an input 120 of the mower unit 100. The righthand power takeoff shaft 180 supplies power through a long transmission shaft 181 to the working implement connected to the front of the tractor through the link mechanism 200. A relay bearing 182 for the transmission shaft 181 is disposed between the brackets 111 to which the front traction links 151 of the mower unit 100 are connected.

As shown in FIG. 10, the relay bearing 182 is in contact with inside faces of the right and left brackets 111 and bolted thereto. The relay bearing 182 defines recesses 183 for receiving inward projections of the pivot pins 201, respectively. Thus, the relay bearing 182 acts also as a reinforcement for the lower links 202 connected to the front mount working implement.

In this way, the power for driving the front mount working implement is taken from the power takeoff shaft 180 disposed rearwardly of the tractor body. While the shaft transmission mechanism is employed to provide a reliable transmission system free from slippage and the like, there is no need to flex the mechanism to a great degree at coupling positions, thereby assuring a smooth power transmission. This construction also allows for compactness with a small fore and aft length when the front mount working implement is connected to the tractor.

What is claimed is:

1. A frame structure for a vehicle body including a main frame means to which a working implement is secured, said main frame means including a pair of closely spaced apart right and left front frames and a pair of closely spaced apart right and left rear frames, said right and left frames of each pair of front and rear frames being spaced apart transversely of said vehicle body and extending in alignment with each other longitudinally of said vehicle body, said pair of closely spaced rear frames being disposed in axial alignment with and at a lower level than said pair of closely spaced front frames with intermediate connecting means (7) connecting said right and left frames of said front and rear frames to each other, said main frame means further including a cross support member connected transversely to bottom surfaces of said closely spaced apart right and left front and rear frames approximately intermediate of their length, said cross support member housing opposite ends that extend outwardly of said right and left closely spaced front and rear frames, and connecting support means (10, 11, 101, 102) secured to said opposite ends of said cross support member for connecting working implements.

2. A frame structure as claimed in claim 1, wherein said right and left front frames support front wheels, and said right and left rear frames support rear wheels.

3. A frame structure as set forth in claim 1 wherein said connecting support means includes a channel shaped reinforcing member (11) and a channel shaped connecting and supporting member (10).

4. A frame structure as claimed in claim 3, wherein said working implement connecting means includes socket connections opening upwardly.

5. A frame structure as claimed in claim 4, wherein said working implement is a front loader implement having vertical columns inserted into said socket connections, and lateral support arms connected to said spaced parts of front frames.

6. A frame structure as claimed in claim 2, wherein said connecting support means includes pivot pins extending laterally outwardly.

7. A frame structure as claimed in claim 6, which includes a vertically movably parallel link mechanism, said parallel link mechanism having rear links connected to said pivot pins, and front links connected to said spaced pair of front frames for supporting a working implement such as a mower for vertical movement relative to said main frame means.

8. A frame structure as set forth in claim 1 wherein said connecting support means includes an upturned end on each extending end of said cross support member, and a mounting bracket (102) and a pivot pin (101) on each end for supporting a mower via a parallel link mechanism haivng rear links connected to said pivot pins.

9. A frame structure as set forth in claim 3 wherein said connecting support means includes an upturned end on each extending end of said cross support member, and a mounting bracket (102) and a pivot pin (101) on each end for supporting a mower via a parallel link mechanism having rear links connected to said pivot pins.

10. A frame structure as set forth in claim 3 wherein said implement is a front loader having connecting means and in which said channel shaped connecting and supporting member (10) includes socket connections which open upwardly for receiving vertical support columns for supporting said front loader connecting means, and said right and left front frames carry a lateral connecting pipe and front links of a link mechanism connected thereto for supporting said front loader implement.

11. A frame structure as set forth in claim 8 wherein said implement is a front loader having connecting means and in which said channel shaped connecting and supporting member (10) includes socket connections which open upwardly for receiving vertical support columns for supporting said front loader connecting means, and said right and left front frames carry a lateral connecting pipe and front links of a link mechanism connected thereto for supporting said front loader implement.

12. A frame structure as set forth in claim 1 wherein said right and left front and rear frames are rectangular in cross section.

* * * * *